United States Patent [19]
Gessert

[11] Patent Number: 6,023,810
[45] Date of Patent: Feb. 15, 2000

[54] GRILL CLEANING APPARATUS INCORPORATING DETACHABLE HANDLE AND HOLDER FOR REMOVABLE SCOURING PAD

[76] Inventor: Roy E. Gessert, 10150 Stern Ave., Cupertino, Calif. 95014

[21] Appl. No.: 09/124,459

[22] Filed: Jul. 28, 1998

[51] Int. Cl.⁷ .............................. A47L 13/10; A47L 17/08
[52] U.S. Cl. ............................................ 15/229.13; 15/145
[58] Field of Search ........................... 15/229.11, 229.12, 15/229.13, 244.1, 244.2, 244.3, 145

[56] References Cited

U.S. PATENT DOCUMENTS

| | | |
|---|---|---|
| 1,395,652 | 11/1921 | Motter . |
| 1,620,903 | 3/1927 | Lance . |
| 1,653,652 | 12/1927 | Melniker . |
| 1,660,351 | 2/1928 | Pataki . |
| 1,686,526 | 10/1928 | Lacy . |
| 1,689,769 | 10/1928 | Brell . |
| 1,820,183 | 8/1931 | Darling . |
| 1,887,294 | 11/1932 | Field ................................... 15/229.13 |
| 1,899,552 | 2/1933 | Bookman . |
| 1,905,307 | 4/1933 | Schulhoff . |
| 2,124,429 | 7/1938 | O'Brien . |
| 2,496,371 | 2/1950 | Baker . |
| 2,514,481 | 7/1950 | Ellinger . |
| 2,620,501 | 12/1952 | Bailey . |
| 2,629,890 | 3/1953 | Di Giovanna . |
| 2,778,049 | 1/1957 | Meyer . |
| 2,799,038 | 7/1957 | McCall . |
| 2,888,699 | 6/1959 | Bubar ................................... 15/229.13 |
| 3,015,118 | 1/1962 | Strader . |
| 3,090,064 | 5/1963 | Garrett . |
| 3,473,184 | 10/1969 | Buck, Jr. . |
| 4,071,983 | 2/1978 | Thielen . |
| 4,232,420 | 11/1980 | Schuster et al. . |
| 4,244,075 | 1/1981 | Silver . |
| 5,426,810 | 6/1995 | Rones . |

*Primary Examiner*—Randall E. Chin
*Attorney, Agent, or Firm*—John J. Leavitt

[57] ABSTRACT

Presented is a grill cleaning apparatus including a body for detachably retaining a scouring pad. The body is provided with a "grasp" that may be grabbed by one or both hands to manipulate the body and scouring pad on a surface that requires cleaning. Alternatively, an elongated handle may be detachably and adjustable secured to the "grasp"; so as distance the operator's hands from a hot grill that requires cleaning. Detachable tine means are mounted on the body and are manipulable to enable application of a scouring pad on the tine means, or removal of a scouring pad therefrom.

17 Claims, 5 Drawing Sheets

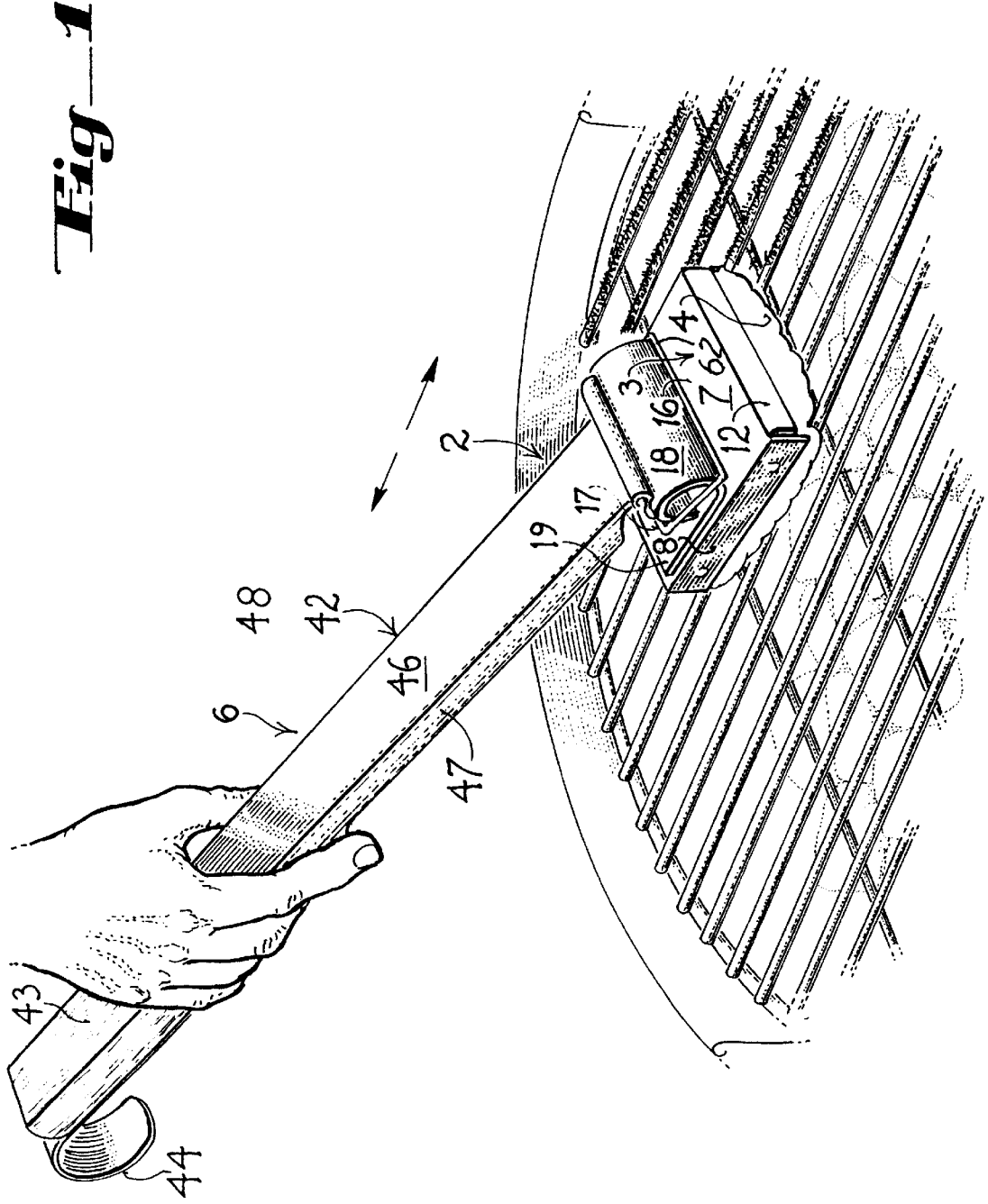

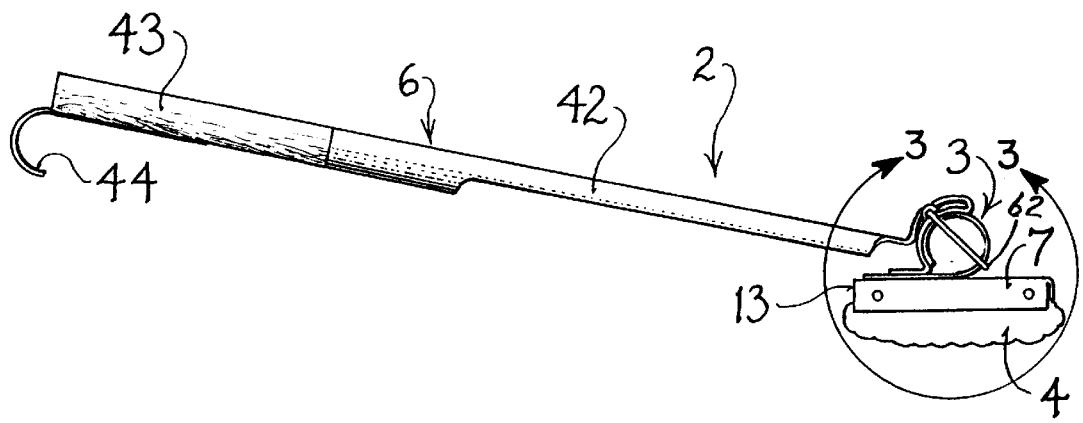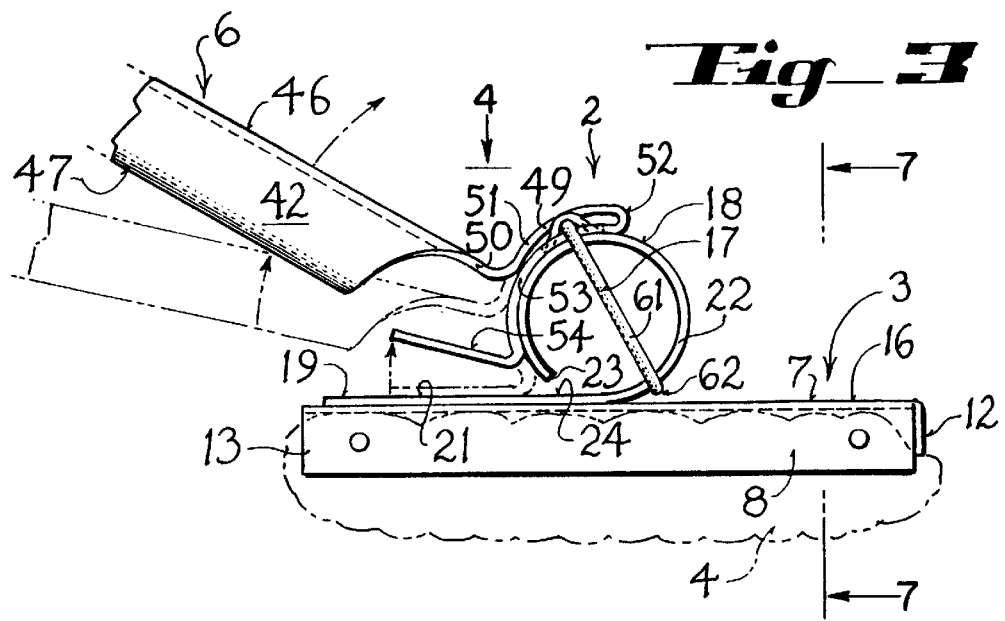

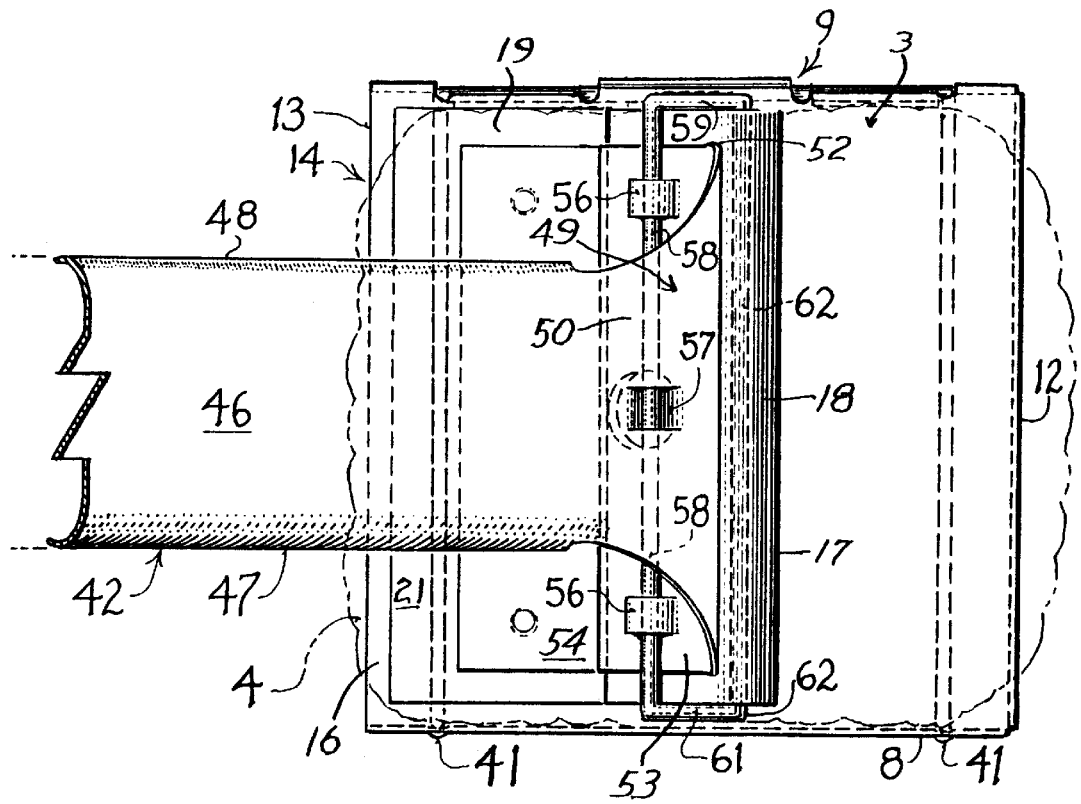
Fig_4
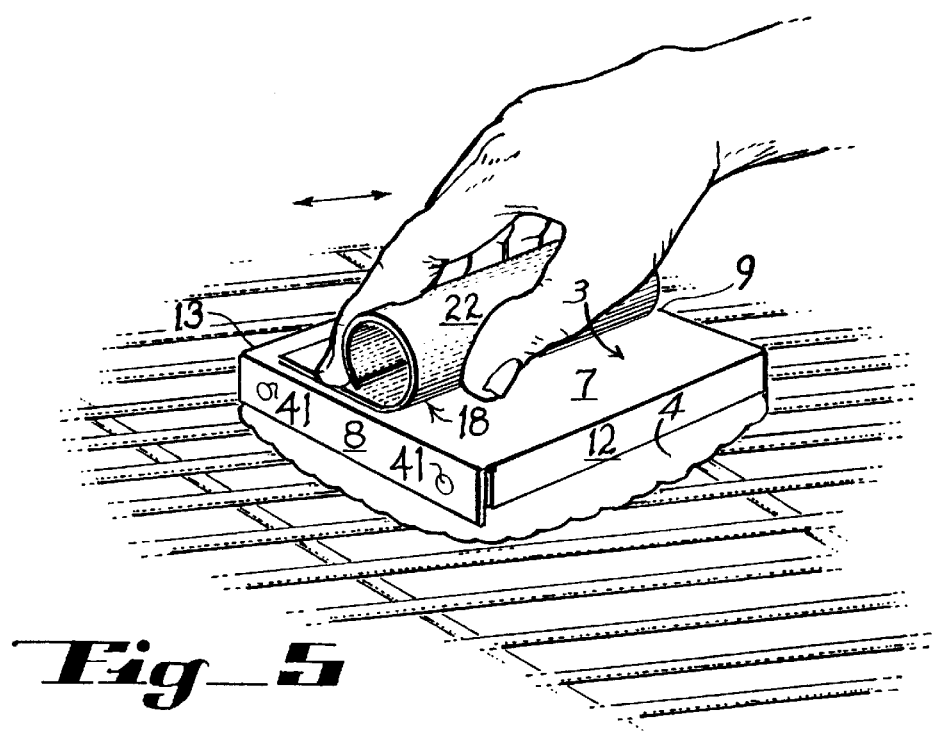
Fig_5

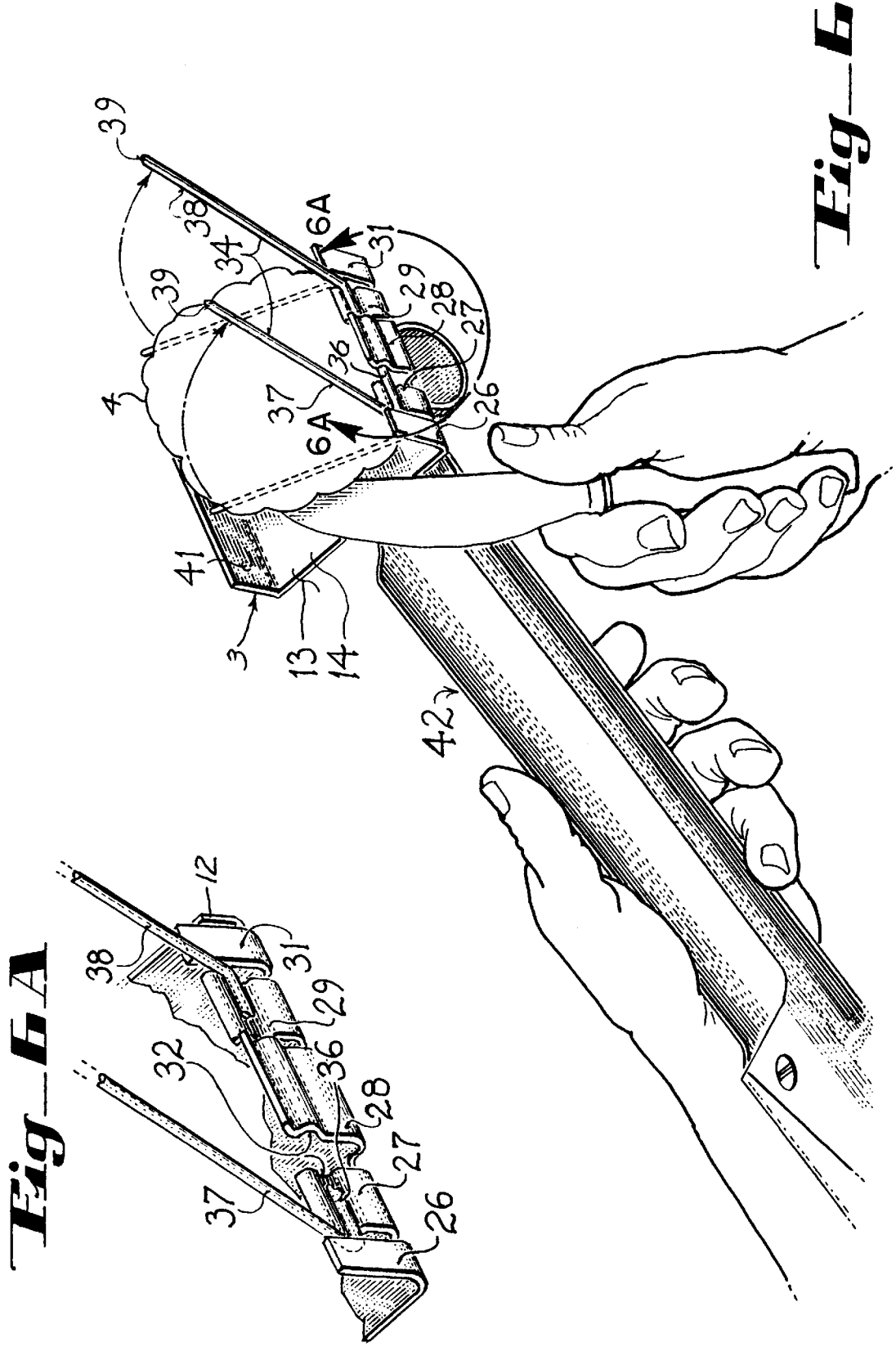

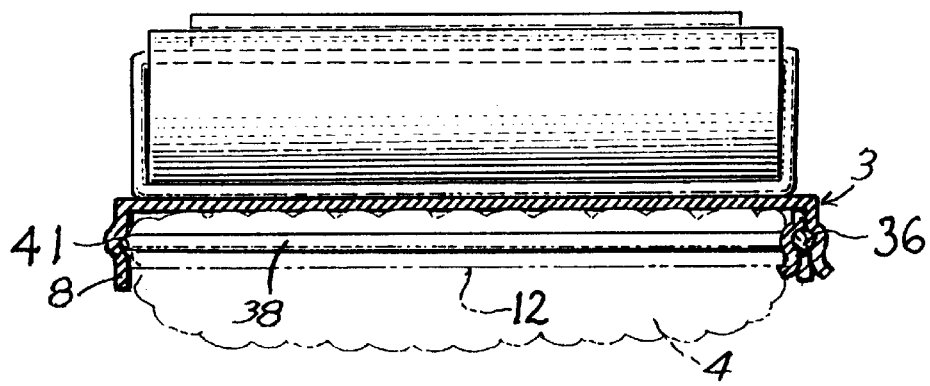
Fig_7
Fig_8
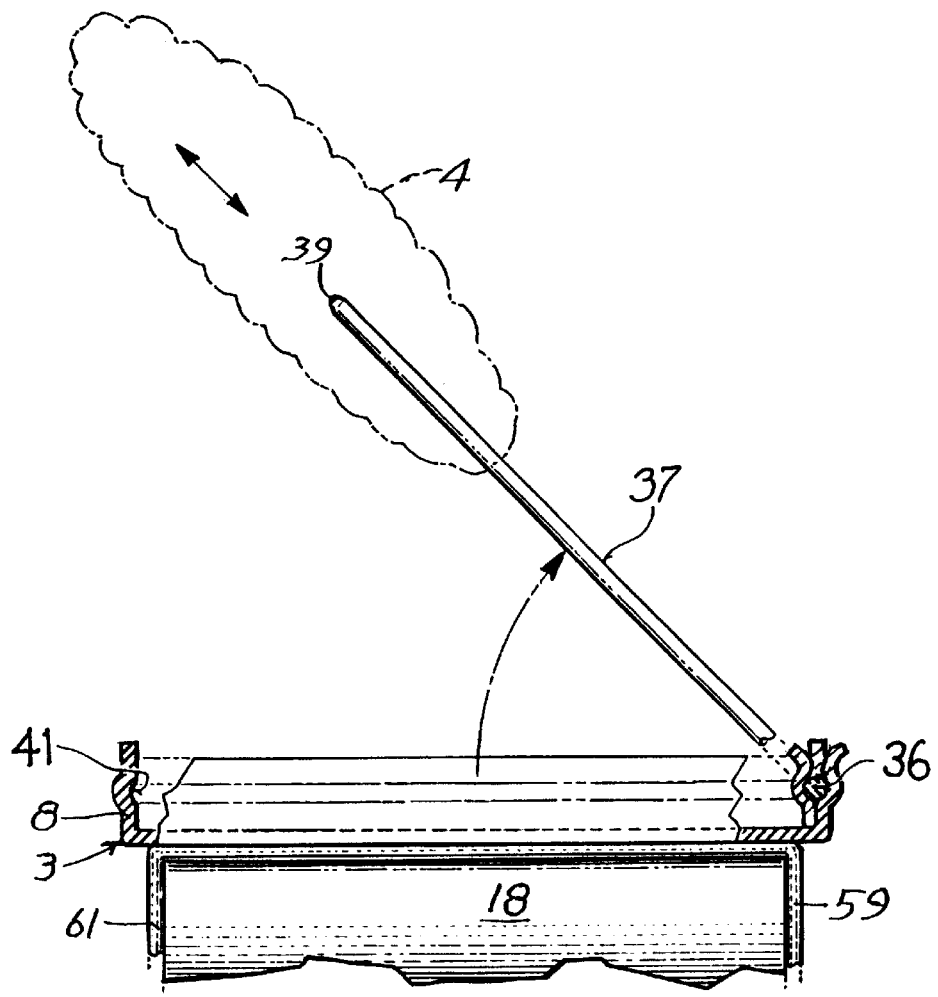

GRILL CLEANING APPARATUS INCORPORATING DETACHABLE HANDLE AND HOLDER FOR REMOVABLE SCOURING PAD

BACKGROUND OF THE INVENTION

1. Field of the Invention

This invention relates to cleaning devices far cooking utensils and equipment, and particularly to a grill cleaning apparatus incorporating a holder far selectively removably securing a scouring pad in position of use and a handle detachably locked to the holder to facilitate remote manipulation of the scouring pad during use.

2. Description of the Prior Art

A preliminary patentability and novelty search has revealed the existence of the following U.S. Pat. Nos.:

| | | |
|---|---|---|
| 1,395,652 | 1,620,903 | 1,653,652 |
| 1,660,351 | 1,686,526 | 1,689,769 |
| 1,820,183 | 1,899,552 | 1,905,307 |
| 2,124,429 | 2,496,371 | 2,514,481 |
| 2,620,501 | 2,629,890 | 2,778,049 |
| 2,799,038 | 3,015,118 | 3,090,064 |
| 3,473,184 | 4,071,983 | 4,232,420 |
| 4,244,075 | | 5,426,810 |

It will be seen from the prior art listed above that for an interval spanning more than seventy years a great deal of creativity was exercised to develop the many different types of devices for accomplishing a rather mundane function, namely, the cleaning of cooking equipment and utensils. Close scrutiny of the structures and mode of operation of the devices described and illustrated in the patents listed above also indicates that these prior art devices are structurally and functionally different from the structure and mode of operation of the invention disclosed herein.

There are several different types of scouring pads, each being an article of manufacture that is generally available in a variety of stores where household goods and utensils are sold. One familiar type is sold under the trademark TUFFY and is formed from synthetic resinous strand material formed generally into a spherical body or mass that is held in the hand and compressed when pressure is applied and the mass is manipulated to effect a scouring action. Another type of scouring pad is formed from stainless steel wire or strands, also gathered together during the manufacturing process to form a generally flat circular body or mass that may be manipulated by hand or with a holder to effect a scouring action.

It is not generally known that these two types of scouring pads may be used and re-used following a cleaning operation, such as might be effected in a conventional dishwasher. Accordingly, it is one of the important objects of the present invention to provide a holder for such scouring pads that will enable application of scouring pressure on the pad and manipulation thereof to effect a scouring action, while detachably retaining the scouring pad to facilitate removal of the scouring pad from the holder for cleaning, and/or cleaning both in assembled form.

The manipulation of a hand-held scouring pad can be detrimental to the fingers and hands, particularly where it is used to clean metal cooking utensils and barbecue grills. Accordingly, it is another important object of the invention to provide a holder for a scouring pad, the holder having an integral projection on one side thereof that may be grasped by a hand to facilitate manipulation of the holder and thus the pad without the hand coming into contact with the scouring pad.

For some types of cleaning, such as cleaning hot barbecue grills, it is an advantage to be able to manipulate a holder for a scouring pad from a reasonable distance from a hot grill, thus protecting the hands and forearm from the heat of the fire and from coming into contact with the heated grill. Accordingly, another object of the invention is the provision of a detachable handle that may be selectively attached or detached from the holder and which, when attached, facilitates manipulation of the holder and scouring pad from a point removed from the holder and scouring pad.

When manipulating a scouring pad holder to which is detachably secured a scouring pad and a handle for manipulating the holder and scouring pad, it is frequently necessary to impose a great deal of pressure on the pad holder and scouring pad by applying pressure on the handle from different angles. Accordingly, a still further object of the invention is the provision of a holder/handle combination that enables the handle to be adjusted in relation to the holder to facilitate application of pressure on the holder through the handle from different angles, or to accommodate the differences in height (relative to the article being cleaned) of the operator of the holder/handle combination.

A still further object of the invention is to provide surfaces comprising and defining the holder which contains the scouring pad within the confines of the holder and which confront the pad at different heights (depth) and on different planes to enhance the scouring action of the pad on curved surfaces of the grill, as well as to provide a rigid "leading" edge which can be manipulated to effectively remove large or stubborn matter or contamination adhering to the grill surfaces.

Yet another object of the invention is the provision of a scouring pad holder having tines mounted thereon manipulable to penetrate the body of the scouring pad and selectively lock the scouring pad detachably to the holder in position for use.

Another object is the provision of a scouring pad holder having tine means mounted thereon so as to minimize the risk of the tine means being misplaced or lost during pad replacement or when the pad is cleaned apart from the holder.

Yet another object of the invention is the provision of a scouring pad holder having tine means detachable from the holder to effect pad cleaning or replacement and then re-attachment and locked to the holder to retain a scouring pad in position of use.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the grill cleaning apparatus of the invention includes a generally quadrilateral body having a flat top wall provided with integrally depending peripheral side walls defining with the top wall a recess within which a scouring pad may be detachably secured. Means in the form of tines may be detachably and adjustably mounted on one perpheral side wall and selectively deployed to impale the body of the scouring pad and then manipulated to lock the tines to the opposite side wall and to retain the impaled scouring pad within the holder recess. A hand-graspable generally tubular projection, hereinafter sometimes referred to as a "grasp", is secured on the flat top wall facilitating manipulation of the holder and scouring pad by hand. Alternatively, the tubular projection comprises an attachment means for an elongated handle that may selectively be attached and detached from the tubular projection and the holder, and which handle may be pivoted within specific limits to vary the angle of the handle in relation to the holder.

BRIEF DESCRIPTION OF THE DRAWINGS

FIG. 1 is a perspective view illustrating the grill cleaning apparatus in operative association with a barbecue grill that requires cleaning.

FIG. 2 is a side elevational view of the grill cleaning apparatus of FIG. 1 shown apart from the barbecue grill, and with the detachable handle mounted on the scouring pad holder and positioned in its lowermost position.

FIG. 3 is an enlarged fragmentary side elevational view of the grill cleaning apparatus of FIG. 2, illustrating the handle mounted on the scouring pad holder and displaced to an elevated position in relation to the scouring pad holder.

FIG. 4 is a fragmentary top plan view in essentially full size of the scouring pad holder and a portion of the handle assembly, a portion of the handle being broken away to reduce the size of the view.

FIG. 5 is a perspective view of the scouring pad holder, equipped with a scouring pad, being manipulated by hand in relation to a barbecue grill to effect cleaning thereof.

FIGS. 6 and 6A are fragmentary perspective views of the grill cleaning apparatus inverted and illustrating in FIG. 6 the manner in which the tines and scouring pad are released from the holder by springing the tines free from one side wall of the holder and pivoting them upwardly to enable the scouring pad to be removed from the tines. FIG. 6A illustrates the camming surfaces and grooves formed in the mounting means for the tines.

FIG. 7 is a front elevational view illustrating the recess formed in the scouring pad holder portion of the apparatus, and illustrating the manner and means for retaining a scouring pad detachably secured to the holder.

FIG. 8 is a front elevational view illustrating the grill cleaning apparatus inverted, and illustrating the scouring pad retaining tines deployed into a position to enable application of or removal of a scouring pad from the tine assembly.

DESCRIPTION OF THE PREFERRED EMBODIMENT

There are many different types of scouring pads that may be purchased commercially for cleaning many different products, including grills, griddles, oven broilers, sports equipment, tools, whitewall tires and of course greasy pots and pans, and other equipment used for cooking, particularly barbecue grills. Cleaning pads sold by Minnesota Mining and Manufacturing Company under the trademark "Scotch-Bright" comprise a flat mass of non-metallic fibers, or a single curled strand of stainless steel meshed to form a scouring pad. Another type of cleaning pad is sold by The Clorox Company under the trademarks "Tuffy" and "S.O.S." and comprises a generally cylindrical roll formed from an elongated strip of woven synthetic resinous strands. Other types of cleaning pads are sold by the Chore Boy division of Reckitt and Coleman, Inc. under various trademarks, including "Golden Fleece" and "Chore Boy", which are used in conjunction with copper, bronze and stainless steel scouring pads, as well as "plastic puffs" and sponges.

While all of these cleaning pads are effective for the purpose for which they are designed, they all share a common characteristic, i.e., each must be manipulated by directly grasping the pads with the fingers of one or both hands, and with the fingers or hands, apply pressure directly on the pads to effectively utilize their scouring capabilities. The subject matter of the invention described and illustrated herein provides a means for holding and manipulating such scouring pads without having to utilize direct pressure of the fingers or hand on the pad, thus eliminating the possibility of trauma that sometimes occurs to the fingers and hands when the scouring pads are manipulated directly by the fingers and/or hands, and which trauma is typically obviated by donning a glove, which holder (and glove) also protect the hand from contamination generated during the scouring operation.

Accordingly, in terms of greater detail, and referring to the drawings herein, the grill cleaning apparatus of the invention is designated generally by the numeral 2, and includes a scouring pad holder designated generally by the numeral 3 adapted to detachably retain a scouring pad designated by the numeral 4 in position to effect a scouring function when applied to a surface to be cleaned. The apparatus also includes an elongated handle designated generally by the numeral 6 designed for pivotal and releasable attachment by one end to the scouring pad holder.

Referring to the scouring pad holder 3 per se, particularly as illustrated in FIG. 5, it will there be seen that the scouring pad holder comprises an article of manufacture that may be utilized effectively for performance of a scouring function even without the use of the elongated handle 6. As there shown, the scouring pad holder 3 comprises a shallow preferably quadrilateral three-sided box-like unit, preferably formed from an appropriate metal, but susceptible of being fabricated from an appropriate synthetic resinous material. When fabricated from metal, the scouring pad holder is preferably formed from stainless steel, but can also be fabricated from a less costly steel or other metal and then plated or chemically treated to provide a protective and esthetically pleasing appearance.

The box-like scouring pad holder 3, when viewed in inverted position of use as seen in FIGS. 1 and 5, includes a generally flat upper wall 7 that is substantially square or rectangular, being about 3½" in width and about 3" long. The wall 7 is provided with integral side flanges 8 and 9 that define the approximately ½" depth of the box-like holder, each of the flanges being coextensive in length with the wall. At one end of the box-like holder, there is provided a third integral flange 12 that is of less depth than the side flanges 8 and 9, having a depth of only about ⅜", and which extends between the associated ends of the side flanges. The opposite end of the box-like holder, as shown in FIG. 6, is devoid of a flange, and is therefore provided with a rectangular opening 14 for a purpose which will hereinafter be apparent.

Mounted medianly on the upper surface 16 of the wall 7 and extending transversely thereacross is a grasping member or "grasp" designated generally by the numeral 17, The portion 18 of the grasping member constitutes a tubular handle of sorts and may be grasped by the fingers of one or both hands and used to manipulate the cleaning apparatus. The grasping member 17 is conveniently fabricated from a sheet metal strip 19 and comprises at one end a flat plate portion 21 that is tack-welded to the metal strip 19 is rolled into a generally cylindrical tube 22, the free end 23 of the plate forming the tube resting adjacent the surface 24 of the flat plate portion 21 as shown in FIG. 3.

Referring to FIGS. 4 and 6, it will be seen that the side flange 9 that depends integrally from the top wall 7 is slit transversely to define five tongues 26, 27, 28, 29 and 31, the three tongues 27, 28 and 29 being spaced from and intermediate the associated end tongues 26 and 31. The tongues 27, 28 and 29 are formed intermediate their lengths with axially aligned grooves 32 pressed into the metal forming each tongue. The aligned groove 32 in the tongue 28 opens toward the interior of the pad holder. The two tongues 27 and 29 lie on opposite sides of the tongue 28, and these two tongues 27 and 29 are also provided with aligned grooves pressed into the metal tongues, but in this case the grooves face outwardly in opposition to the groove 32 in tongue 28. It should be noted that tongues 26 and 31 are formed from what remains of the flange 9 after formation of the tongues 27, 28 and 29, are not provided with grooves, and are aligned in a plane coincident with the common axis of the grooves 32 in intermediate tongues 27, 28 and 29, Since the three grooves 32 are axially aligned, with the axes lying in essentially a common plane that includes the two end tongues 26 and 31, it will be understood that the axes of the three grooves are coincident. As seen in FIG. 6 and 6A, the two grooves 32 in the tongues 27 and 29 lie on one side of the common axis facing outwardly, while the remaining groove in the intermediate tongue 28 lies on the opposite side of the common axis and faces inwardly. Consequently, the three grooves in the three tongues, being axially aligned, cooperate to provide arcuate bearing surfaces for the pivotal mounting of a scouring pad retention member designated generally by the numeral 34 and comprising a generally U-shaped structure including a cross-member 36 pivotally retained in the grooves 32 and at opposite ends being provided with a pair of integral projecting tines 37 and 38 extending perpendicularly from the cross-member 36 and terminating in free ends 39 adapted to detachably engage tine-end receiving recesses 41 formed in the interior surface of the opposite flange 8.

As described above, end tongues 26 and 31 lie in a common plane that is coincident with the axes of the grooves 32 in the three tongues 27, 28 and 29, which also includes the axis of the cylindrical cross-member 36. The end tongues 26 and 31 thus form stops or abutments that prevent cross-member 36 from shifting laterally in relation to the grooved tongues by which it is detachably and pivotally secured. Since the cross-member 36 cannot shift because it is retained in position by the end tongues 26 and 31, it follows that the free ends 39 of the tines 37 and 38 also cannot shift, thus ensuring that the free ends 39 of the tines will be received in the recesses 41 formed in the opposite flange 8.

Additionally, the free end portions of tongues 27, 28 and 29 remote from the top plate 7 from which they extend, are angularly inclined away from the common axis of the grooves, thus forming cooperating and confronting camming surfaces to facilitate the installation of the scouring pad retention member 34 by enabling the cylindrical cross-member 36 to be pressed between the tongues, resiliently displacing the tongue 28 outwardly and the two tongues 27 and 29 inwardly until the cross-member drops into the grooves, whereupon the resilient tongues spring back to pivotally retain the cross-member 36 detachably secured to the wall member 7.

The free ends 39 of the tines, as seen in FIG. 6, may be pivoted out of the recesses 41 away from the opposite flange 8 to expose the free ends of the tines, whereupon a scouring pad 4 may be impaled on the spaced and parallel tines until fully engaged thereon. The two tines may then be pivoted downwardly toward the flange 8 until the free ends 39 of the tines again engage in the tine-end receiving recesses 41 formed in the flange 8. It will thus be Understood that the scouring pad now lies detachably secured by the tines, with the body of the scouring pad projecting past the plane of the free edges of the side flanges and the front flange 12 to provide an exposed surface that may now be imposed on a surface to be cleaned.

It will of course be understood that the scouring pad holder described above, including the scouring pad retention means and the scouring pad detachably secured thereto, constitutes a completed article of manufacture which may be sold and utilized without the elongated handle 6. In this condition of the apparatus, as seen in FIG. 5, the rolled tube 22 may be grasped as depicted and the holder with scouring pad secured thereto manipulated by reciprocating it back and forth on the surface to be cleaned, as indicated by the directional arrow. This form of the apparatus is particularly useful for scouring a grill or other equipment that has become cold so that the close proximity of the hand to the surface being scoured or cleaned will not be abraded, since the structure of the scouring pad holder protects the hand from coming into contact with the surface being cleaned and the contamination generated during the scouring process.

It is generally preferred that a grill be scoured or cleaned while it is initially hot for the reason that the grease contamination or carbonized contamination that has adhered to the grill from its previous use is softened and may therefore more easily be removed. There is of course a risk that the hand or fingers will come into intimate contact with the hot grill and be burned if such scouring or cleaning progresses with the apparatus as illustrated in FIG. 5.

Accordingly, referring to FIGS. 1, 2, 3, 4 and 6, the elongated handle 6 there shown is provided for detachable and adjustable securement to the scouring pad holder 3 illustrated in FIG. 5. As shown in FIG. 1, the handle 6 includes a rigid channel-shaped metal portion 42 fixedly attached to a wooden portion 43 that insulates the hand of the user from heat that might be conducted to the metal portion of the handle from the scouring pad holder and the hot grill being scoured. One end of the wooden portion of the handle is conveniently attached to the associated and overlapping end portion of the channel-shaped metal portion of the handle with appropriate screws (not shown), and the handle is also provided with a hook member 44 fastened to the underside of the handle to enable vertical storage by suspension of the grill cleaning apparatus when not in use.

At its end remote from the wooden handle portion, as seen in FIG. 4, the channel-shaped metal handle portion, which includes a central web 46 integrally joining side flanges 47 and 48, is shaped to terminate the side flanges of the channel and continue the extension of the web 46 in a transversely symmetrically flared and elongated metal member designated generally by the numeral 49. As seen in FIG. 3, the elongated metal member is bent upwardly adjacent its root portion 50 and then flares upwardly and outwardly in an integral portion 51 that is initially substantially perpendicular to the root portion 50 from which it extends, and then proceeds forwardly and outwardly in a convexly curved arcuate configuration to a bend 52. From the bend 52, the member is bent rearwardly to produce a reentrant arcuate portion 53 that initially lies spaced from the arcuate portion 51 and then converges toward the portion 51 so as to abut the portion 51 at the initial bend of the member at its root 50, The arcuate portion 53 flares outwardly and continues past the root bend 50 and across the open end of the channel-shaped metal handle portion. The curvature of the arcuate portion 53, when applied to the holder, conforms to the curvature of a portion of the outer periphery of the tubular member 18 of the holder as shown in FIG. 3. The end portion 54 of the metal member is then bent rearwardly generally toward the open end of the channel in a flat cantilever-like manner that functions as a stop in a manner that will hereinafter appear.

Referring to FIG. 4, it will be seen that there is formed in the reentrant metal member 53 a pair of laterally spaced pivot bearing members 56 struck from the metal from which the member 53 is formed so as to provide a passageway thereunder. In like manner, a third pivot bearing member 57 is struck from the metal member adjacent its root portion 50 to provide a passageway thereunder, and this bearing member is inverted in relation to the pivot bearings 56. Thus, the passageways formed by the pivot bearing members 56 and 57 are axially aligned and adapted to pivotally receive the passage of an elongated metal rod 58. As seen in FIGS. 1, 2, 3 and 4, the metal rod 58 extends for the full length of the tubular member 18. At opposite ends, the metal rod 58 is bent perpendicularly to provide parallel end members 59 and 61 that extend transversely, i.e., substantially diametrically, across the open ends of the tubular member 18. This relationship is best seen in FIGS. 1–4. The corresponding ends of the parallel end members 59 and 61 are then integrally joined by a second elongated rod 62 that is parallel with the first mentioned elongated rod 58, but which lies associated with the opposite periphery of the tubular member 18 when the handle assembly is applied to the scouring pad holder as shown in FIG. 3. It will thus be seen that the parallel end members 59 and 61 are gauged in length to be slightly less than the outer diameter of the tubular member 18 so that the two parallel elongated rods 58 and 62 may lie contiguously along the length of the tubular member 18 at opposite ends of the two parallel end members 59 and 61.

The parallel end members 59 and 61 maintain elongated rod 62 at a distance of approximately 90% of the unstressed diameter of tubular member 18 from reentrant member 53. When rod 62 is positioned on tubular member 18 opposite flat portion 21 and the root of the bend between 53 and 54 is also in contact with member 18, member 18 resiliently flexes and reduces its diameter to the distance equal that distance between 53 and 62 when the handle is moved downward (54 towards 21) and the metal edge between 53 and 54 glides over the periphery of member 18. When parallel members 59 and 61 move past the reduced diameter of 18, member 18 resiliently increases its diameter, thus detachably securing the handle to the holder by maintaining rods 58 and 62 in combination with member 53 on the circumferential portion of member 18 adjacent to wall 7 which circumferential portion is less than half the circumference of the tube 18 in its fully formed and relaxed or unstressed state.

The two elongated rods 58 and 62 thus form a "hasp" that engages the tubular member 18, retaining the handle assembly with the arcuate reentrant metal member 53 in close proximity to the outer periphery of the tubular member 18, and adjustable along the circumference of member 18 from the position as shown in FIG. 3, wherein the flat cantilever plate portion 54 is elevated above the surface 24, to a lowered position as shown in broken lines wherein the flat cantilever plate portion 54 lies contiguously against the surface 24 of the plate portion 21, thus functioning as a stop, maintaining the handle at an angle to the holder which facilitates a "best scouring angle" of approximately 12 degrees to the flat wall 7.

Thus, to remove the handle assembly so that the scouring pad holder may be utilized without the elongated handle as seen in FIG. 5, all that is required is that the elongated handle be lifted and pivoted clockwise, reducing the diameter of the resilient tubular member 18 as it seeks to attain a diameter equal to the distance between member 53 and rod 62 which when the distance between 53 and 62 passes the apex of the reduced diameter of member 18, the handle is free of the grasping action of the "hasp" on the tubular member 18. To apply the elongated handle to the scouring pad holder, all that is required is that the handle be positioned so that the "hasp" drapes over the tubular member 18, whereupon the elongated handle is lowered to effect the grasping action that retains the elongated handle assembly detachably secured to the scouring pad holder.

Having thus described the invention, what is believed to be new and novel and sought to be protected by letters patent of the United States is as follows.

I claim:

1. A cleaning apparatus for scouring cooking utensils and equipment such as barbecue grills utilizing a scouring pad, comprising:

a) a holder for detachably retaining a scouring pad in an attitude of use to abrade a surface to be cleaned;

b) a grasp mounted on said holder adapted to be gripped for manipulating the holder to cause a scouring pad mounted on said holder to abrade the surface to be cleaned; and c) tine means mounted in cooperative combination on said holder and manipulable between a scouring pad impaling position wherein the scouring pad may be impaled on said tine means and selectively manipulated to a scouring pad retention position in which the scouring pad and said tine means are detachably locked to said holder;

d) wherein said holder is fabricated from metal and includes a flat quadrilateral top wall plate having integral depending peripheral flanges on at least two opposite sides between which a scouring pad may be detachably confined.

2. The cleaning apparatus according to claim 1, wherein means are provided on said holder for pivotally mounting said tine means for selective pivotal movement between a detachably locked position extending transversely parallel to said body and an unlocked position angularly disposed to said body, whereby a scouring pad may be selectively impaled on or disimpaled from said tine means when angularly disposed to said body and said tine means retains said scouring pad detachably locked to said body when transversely parallel thereto.

3. The cleaning apparatus according to claim 1, wherein said tine means includes at least one tine having a free end, and at least one recess is formed in said holder to lockingly receive said one free end of said at least one tine when said at least one tine is selectively positioned transversely parallel to said holder.

4. The cleaning apparatus according to claim 1, wherein said holder is fabricated from metal and includes a flat top plate, and said grasp is fixedly mounted on said flat top plate.

5. The cleaning apparatus according to claim 1, wherein said holder comprises a box-like unit formed by a flat generally quadrilateral upper wall from three peripheral edges of said upper wall depend integral flanges that cooperate with said flat upper wall to form a recess therebetween within which said scouring pad may selectively be secured.

6. The cleaning apparatus according to claim 5, wherein two of said flanges confront one another, and said tine means includes at least one elongated tine having a bearing portion pivotally mounted on one of said confronting flanges and a free end portion perpendicular to said bearing portion and detachably engagable with the opposite confronting flange.

7. The cleaning apparatus according to claim 1, wherein a third integral depending flange is provided between said at least two opposite side flanges, said third flange being approximately 25% less in depth than said two side flanges.

8. The cleaning apparatus according to claim 1, wherein one of said two opposite side flanges is provided with multiple slits defining a multiplicity of laterally displaceable resilient tongues, at least three of said tongues each having a groove formed therein axially aligned with the grooves in the others of said at least three tongues, the groove in one of said at least three tongues facing in a direction opposed to the direction in which the grooves face in the others of said at least three tongues, said tine means including a portion pivotally mounted in said grooves in said at least three tongues and having a free end detachably engaging the opposite one of said two opposite side flanges when said tine means is positioned transversally parallel with said holders.

9. The cleaning apparatus according to claim 1, wherein said grasp comprises an elongated body circumferentially formed about a central axis and mounted generally medianly on said flat quadrilateral top wall plate on the opposite side thereof from which said flanges depend.

10. The cleaning apparatus according to claim 9, wherein said circumferentially formed elongated body is an integral extension of a flat plate, said flat plate is attached to said flat quadrilateral top wall plate, the circumference of said circumferentially formed elongated body having a gap adjacent said flat plate from which it is formed whereby said circumferentially formed elongated body may be circumflexed by the application of pressure thereto to close said gap and resiliently reduce the diameter of said circumferentially formed body.

11. A cleaning apparatus for scouring cooking utensils and equipment such as barbecue grills utilizing a scouring pad, comprising:

a) a holder for detachably retaining a scouring pad in an attitude of use to abrade a surface to be cleaned;
   b) a grasp mounted on said holder adapted to be gripped for manipulating the holder to cause a scouring pad mounted on said holder to abrade the surface to be cleaned; and
   c) tine means mounted in cooperative combination on said holder and manipulable between a scouring pad impaling position wherein the scouring pad may be impaled on said tine means and selectively manipulated to a scouring pad retention position in which the scouring pad and said tine means are detachably locked to said holder;
   d) wherein said grasp comprises a circumferentially hollow tubular member having a predetermined outside diameter.

12. A cleaning apparatus for scouring cooking utensils and equipment such as barbecue grills utilizing a scouring pad, comprising:

a) a holder for detachably retaining a scouring pad in an attitude of use to abrade a surface to be cleaned;
   b) a grasp mounted on said holder adapted to be gripped for manipulating the holder to cause a scouring pad mounted on said holder to abrade the surface to be cleaned;
   c) tine means mounted in cooperative combination on said holder and manipulable between a scouring pad impaling position wherein the scouring pad may be impaled on said tine means and selectively manipulated to a scouring pad retention position in which the scouring pad and said tine means are detachably locked to said holder; and
   d) an elongated handle assembly detachably gripping said grasp, whereby said holder may be manipulated through said handle assembly.

13. The cleaning apparatus according to claim 12, wherein said handle assembly includes a bearing portion slidably impinging on said grasp and angularly adjustable in relation to said holder to accommodate use of said cleaning apparatus by persons of different height.

14. The cleaning apparatus according to claim 13, wherein said handle assembly includes a hasp impinging on said grasp and cooperating with said bearing portion of said handle assembly to detachably grip said grasp.

15. The cleaning apparatus according to claim 14, wherein said handle assembly includes a stop member for limiting said angular adjustability of said handle.

16. The cleaning apparatus according to claim 14, wherein said grasp comprises an elongated body circumferentially formed about a central axis as an integral extension of a flat plate attached to said flat quadrilateral top wall plate, the circumference of said circumferentially formed body having a gap adjacent said flat plate of which it is an extension whereby said circumferentially formed elongated body is susceptible to circumflexion upon the application of a diametrically directed force on the circumference thereof to close said gap and reduce the diameter of said circumferentially formed body, said bearing portion and said hasp impinging on said grasp imposing a diametrically directed force on said circumferentially formed body to effect circumflexion of said elongated body to reduce the diameter thereof sufficiently to enable circumferential displacement of said bearing surface and chordal displacement of said hasp when said handle is pivoted circumferentially about the axis of said elongated circumferentially formed grasp.

17. The cleaning apparatus according to claim 16, wherein said hasp comprises an elongated closed loop having a quadrilateral configuration defined by elongated spaced and parallel rods parallel to the axis of said circumferentially formed grasp, said elongated rods joined integrally at opposite ends by end rods having a length slightly less than the outside diameter of said circumferentially formed grasp, whereby chordal shifting of said end rods from one side to the other of the axis of said circumferentially formed body effects imposition of a force on said grasp resulting in said circumflexion thereof.

* * * * *